June 21, 1966      J. A. GOOD      3,257,287
DRIVE MECHANISM FOR A NUCLEAR REACTOR CONTROL ROD
Filed April 6, 1962      2 Sheets-Sheet 1
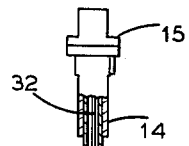
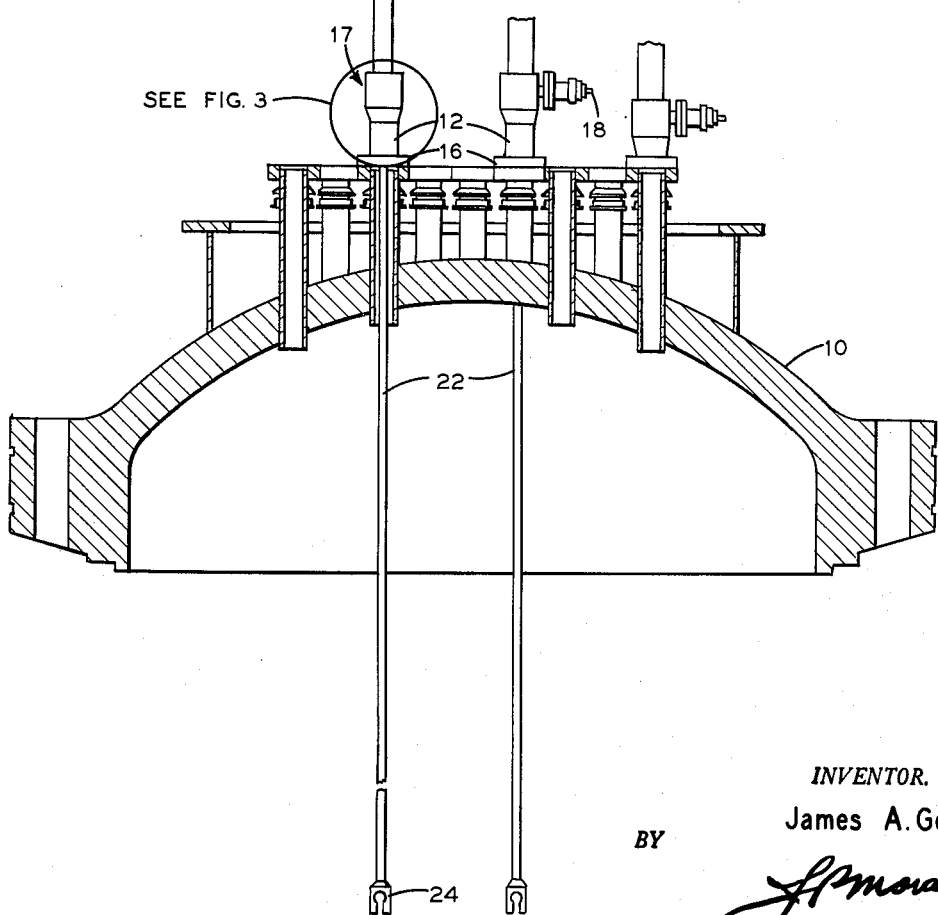
*INVENTOR.*
James A. Good
BY
ATTORNEY June 21, 1966  J. A. GOOD  3,257,287
DRIVE MECHANISM FOR A NUCLEAR REACTOR CONTROL ROD
Filed April 6, 1962  2 Sheets-Sheet 2
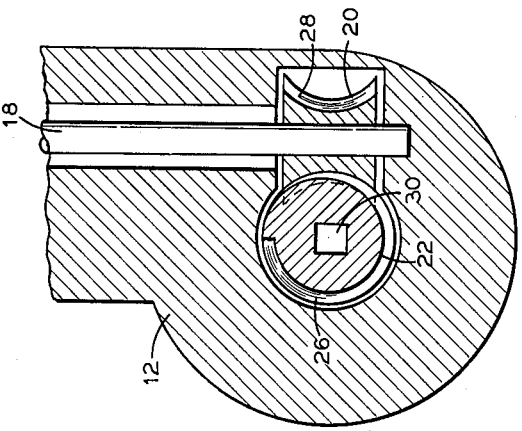
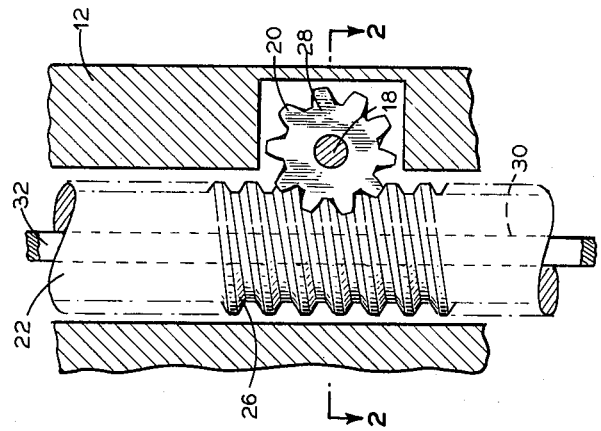
INVENTOR.
James A. Good
BY
ATTORNEY 3,257,287
DRIVE MECHANISM FOR A NUCLEAR REACTOR CONTROL ROD
James A. Good, Lynchburg, Va., assignor to The Babcock & Wilcox Company, New York, N.Y., a corporation of New Jersey
Filed Apr. 6, 1962, Ser. No. 185,610
3 Claims. (Cl. 176—36)

This invention relates in general to a drive mechanism for a nuclear reactor control rod and, more particularly, it refers to a rack and pinion type drive mechanism.

Control rods used in nuclear reactors require drive mechanisms which can accurately position the rod within the reactor core for the precise control of reactivity. Rack and pinion arrangements have been used as drive mehanisms for control rods because they have the capability for accurately positioning a control rod along its path of travel. However, when a rack and pinion driven control rod has to be removed from the core, it presents a problem. First, the rack must be disengaged from the pinion so that the rack can in turn be removed from the control rod. Such a method of control rod removal is time consuming, requiring considerable disassembly and subsequent assembly of the drive rod mechanism.

It is the primary object of this invention to provide a rack and pinion control rod drive mechanism which does not require disassembly of the rack from the pinion for the removal of the control rod.

Accordingly, in the present invention a control rod is disposed in and linearly positionable through a reactor core by means of a rack and pinion drive mechanism. The rack or drive rod is circular in cross section and is detachably coupled to the control rod. Teeth are cut on a helical or screw type pitch into the surface of the drive rod, and they matingly engage similar teeth cut in the surface of the pinion. The surface of the pinion engaging the drive rod is concave so that it can properly mesh with the rounded surface of the drive rod. A keeper extends into an opening in the drive rod preventing it from rotating as it is propelled by the pinion for positioning the control rod along its path of travel.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

Of the drawings:

FIG. 1 is a sectional elevation view of a nuclear reactor vessel closure head embodying the present invention;

FIG. 2 is a sectional view taken along line 2—2 in FIG. 3; and

FIG. 3 is an enlarged detail view partly in section, of a portion of the encircled part of FIG. 1.

The arrangement shown in FIG. 1 can be used in any of the known reactors which employ control rods. Though the control rods are shown as top mounted, obviously they also could be bottom mounted, for insertion through the base of the reactor.

In FIG. 1 a reactor vessel closure head 10 is penetrated by a number of vertically extending housings 12, only one of which, for pictorial purposes, is shown full. Each of the housings is closed at its upper end and has a vertically extending channel 14 communicating with the interior of the reactor. Upper and lower flanged joints 15 and 16, respectively, are disposed in each housing.

Within each housing 12 there is a control rod drive mechanism 17 for positioning a control rod (not shown) along its vertical path of travel in the reactor core. The control rod drive mechanism is made up of a shaft 18 which drives a pinion gear 20 which in turn is in operating engagement with an elongated circular rack or drive rod 22 extending through the channel 14. At its lower end the drive rod 22 has a coupling 24 for connection to the control rod. The coupling is of a type, such as in a bayonet joint, which will permit the drive rod and the control rod to be easily disconnected.

Helical teeth 26 are cut into the surface of the drive rod and extend along its length for a distance at least equal to the length of the path of travel of the control rods within the reactor. These helical teeth 26 matingly engage similarly formed teeth 28 on the pinion gear 20. The surface of the pinion gear is concave so that it can properly mate with the surface of the drive rod.

Extending axially downward through the drive rod from its upper end is a slot 30 of rectangular cross section. Extending downwardly in sliding relationship into the slot 30 is a keeper 32 which is attached at its upper end to the housing 12. The keeper is of substantially the same cross sectional shape as the slot so that it restrains the drive rod from rotating, which it would ordinarily do, when it is propelled by the pinion gear 20.

When the reactor is operating the control rods are positioned in the core by means of the shaft 18 which drives pinion gear 20 which in turn propels the drive rod 22. On shutdown all of the control rods are inserted for their full length into the core. With the reactor shut down either one or all of the control rods may be removed from the reactor.

If a single control rod is to be removed, the upper joint 15 of the housing 12 is opened and the keeper 32 is removed from the slot 30. With the keeper extracted the drive rod 22 is rotated by means of the pinion and uncoupled from its respective control rod. Next, by opening the lower joint 16 the control rod drive mechanism 17 and the associated housing 12 are removed as a unit thereby permitting access to the control rod to which the drive rod 22 was attached.

When the closure head 10 is to be removed from the reactor vessel, the same steps are followed as set forth above except that the lower joint is not opened. Instead, when all the drive rods are uncoupled from the respective control rods, the closure head is lifted off the reactor vessel with the housings 12 and their control rod drive mechanisms 17 still in place. With the closure head off access may be had to all of the control rods as well as to the fuel elements which make up the core.

Therefore, using the present invention, control rods may be removed from the reactor without the necessity of disassembling the control rod drive mechanism. Instead, while still in engagement with the pinion gear, the drive rod may be rotated and uncoupled from the control rod. This arrangement greatly simplifies the control rod removal operation.

While in accordance with the provisions of the statutes there is illustrated and described herein a specific embodiment of the invention, those skilled in the art will understand that changes may be made in the form of the invention covered by the claims, and that certain features of the invention may sometimes be used to advantage without a corresponding use of the other features.

What is claimed is:

1. In a nuclear reactor a control rod drive mechanism comprising a reactor head, a control rod positioned within said reactor, a drive rod of circular cross section detachably coupled to said control rod and extending through said reactor head, said drive rod having teeth cut on a helical pitch into its surface, a pinion gear located on the exterior of said reactor head and engageable with and arranged to drive said drive rod and its attached control rod in a linear direction, said pinion gear having a concave surface with teeth cut therein for mating engagement with the teeth on said drive rod, means arranged on the exterior of said reactor for driving said pinion gear, and disengageable keeper means situated outside of the reactor and communicating with said drive rod for preventing said drive rod from rotating when it is engaged in driving relationship with said pinion gear.

2. In a nuclear reactor a control rod drive mechanism comprising a reactor head, a control rod positioned within said reactor, a drive rod of circular cross section detachably coupled to said control rod and extending through said reactor head, said drive rod having teeth cut on a helical pitch into its surface and having a longitudinally extending opening therein, a pinion gear located on the exterior of said reactor head and engageable with and arranged to drive said drive rod and its attached control rod in a linear direction, said pinion gear having a concave surface with teeth cut therein for mating engagement with the teeth on said drive rod, means arranged on the exterior of said reactor for driving said pinion gear, and disengageable keeper means having its upper end situated outside of the reactor and extending downwardly into the opening in said drive rod for preventing said drive rod from rotating when it is engaged in driving relationship with said pinion gear.

3. In a nuclear reactor a control rod drive mechanism comprising a reactor head, an elongated upstanding housing mounted on the exterior of said reactor, said housing having a channel extending longitudinally therethrough and communicating with the interior of said reactor, a control rod positioned within said reactor, a drive rod of circular cross section detachably coupled to said control rod and extending upwardly through said reactor head into said channel, said drive rod having teeth cut on a helical pitch into its surface and having a slot of rectangular cross section extending axially therethrough, a disengageable keeper attached at its upper end to said housing and extending downwardly into the slot in said drive rod, said keeper having a cross-sectional shape substantially the same as that of said slot and slidably disposed therein, a pinion gear located on the exterior of said reactor head and engageable with and arranged to drive said drive rod and its attached control rod in a linear direction, said pinion gear having a concave surface with teeth cut therein for mating engagement with the teeth on said drive rod, and means arranged on the exterior of said reactor for driving said pinion gear.

References Cited by the Examiner
UNITED STATES PATENTS

| | | | |
|---|---|---|---|
| 1,795,567 | 3/1931 | Maurice | 74—422 |
| 1,830,369 | 11/1931 | McIntosh | 74—422 |
| 2,201,670 | 5/1940 | Kraus | 74—422 |
| 2,985,574 | 5/1961 | Newson et al. | 176—36 |

LEON D. ROSDOL, *Primary Examiner.*

BROUGHTON G. DURHAM, CARL D. QUARFORTH,
*Examiners.*

W. S. RATLIFF, M. R. DINNIN, L. DEWAYNE RUTLEDGE, *Assistant Examiners.*